United States Patent [19]

Miyaoka et al.

[11] 4,180,083

[45] Dec. 25, 1979

[54] SYSTEM FOR CONTROLLING FLOW RATE IN PIPELINES

[75] Inventors: Shinichiro Miyaoka, Nishi-tama; Kuniaki Matsumoto; Junichi Hatakeyama, both of Kokubunji, all of Japan

[73] Assignee: Hitachi, Ltd., Japan

[21] Appl. No.: 843,253

[22] Filed: Oct. 18, 1977

[30] Foreign Application Priority Data

Oct. 20, 1976 [JP] Japan .................... 51/124980

[51] Int. Cl.$^2$ .................................................. F04B 41/02
[52] U.S. Cl. ........................... 137/101.25; 137/255; 137/386; 137/565; 137/571
[58] Field of Search .............. 137/101.25, 236, 255, 137/256, 386, 391, 565, 566, 567, 571; 405/52, 53; 417/36; 210/104, 262

[56] References Cited

U.S. PATENT DOCUMENTS

| | | |
|---|---|---|
| 3,503,411 | 3/1970 | Bauer et al. ............... 137/101.25 |
| 3,786,835 | 1/1974 | Finger ........................... 137/566 |
| 3,920,550 | 11/1975 | Farrell, Jr. et al. ............ 210/104 |

Primary Examiner—William R. Cline
Attorney, Agent, or Firm—Craig and Antonelli

[57] ABSTRACT

System for controlling flow rate in pipelines connecting a plurality of reservoirs is disclosed. Flow rate $Q_{ij}(t)$ of fluid flowing from one reservoir (i) to another reservoir (j) is first calculated from the water levels $H_i(t)$, $H_j(t)$ of both reservoirs (i), (j) and then water level $H_j(t+1)$ of the reservoir (j) at the time (t+1) is calculated from its inflow and outflow taking into account the predicted amount of demand $Q_{je}(t)$.

If the water level $h_j(t+1)$ is below or over the predetermined lower or upper limitation, manipulated variables for valves and pumps installed in pipelines are regulated to control inflow of the reservoir (j) so that the required fluid-feed is satisfied while maintaining the scheduled water level of the reservoir (j).

11 Claims, 15 Drawing Figures

SYSTEM FOR CONTROLLING FLOW RATE IN PIPELINES

BACKGROUND OF THE INVENTION

This invention relates to a fluid transportation system in which a plurality of reservoirs are connected by pipelines. More particularly, it relates to a system which controls flow rates in pipelines highly precisely so as to hold the water level of a reservoir at a desired value while satisfying the amount of demand for fluid.

As the fluid transportation systems, there are mentioned a water supply system, a gas supply system, etc. Hereunder, in order to make the description concrete, the water supply system will be taken as an example.

With increase in the amount of demand for water, the margin of the water-feed capability has lessened and the working conditions of the water supply system have become severer year after year. It has accordingly become difficult to meet the severe working conditions with a method wherein a skilled operator empirically controls the water supply every moment on the basis of the operation data of the water supply system in the past and the measured flow rate of each pipeline as well as the predicted amount of demand.

In order to overcome the difficulty, some control methods for the water supply system have been proposed. These methods, however, disregard the water-level fluctuations of a reservoir. Disadvantageously, therefore, the flow rate error becomes large, and it is impossible to schedule the water feed and control the flow rate at high precision according to the demand.

Figures 1A, 1B:
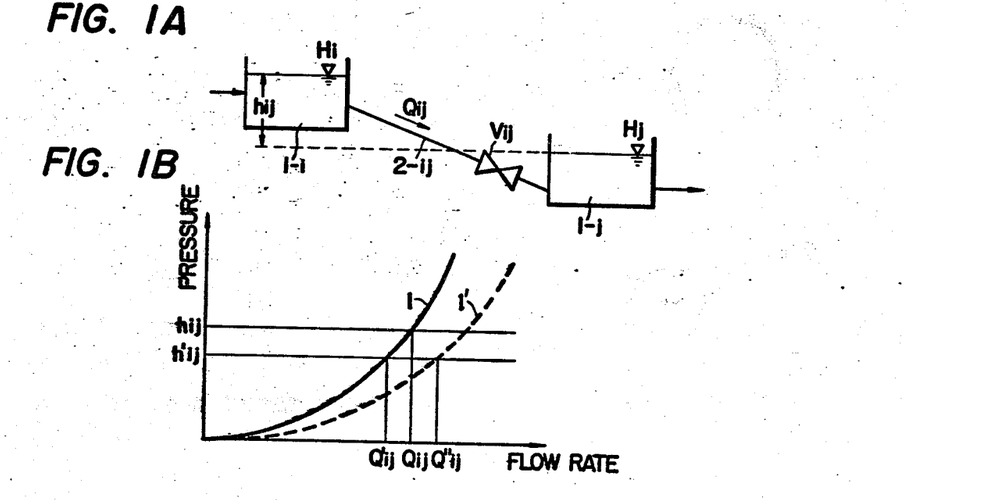
FIGS. 1A and 1B and FIGS. 2A and 2B are diagrams for explaining the relationship between the water level of a reservoir and the flow rate in a pipeline.

Especially, in a system wherein water is supplied from a reservoir to, for example, another reservoir by the gravitational flow, a fluctuation in the difference between both the water levels represented by the heights above the sea level has an unnegligible influence on the flow rate. FIG. 1A shows a gravitated flow unit, in which water at a flow rate $Q_{ij}$ is supplied from one reservoir 1-i to the other reservoir 1-j through a pipeline 2-ij as well as a valve $V_{ij}$. As illustrated in FIG. 1B, when the water-level difference $h_{ij}=H_i-H_j$ between both the reservoirs 1-i and 1-j has changed to $h'_{ij}$, the flow rate changes from the value $Q_{ij}$ to a value $Q'_{ij}$ even if the degree of opening of the valve $V_{ij}$ remains unchanged. In FIG. 1B, a solid line l and a dotted line l' are head loss—flow rate characteristic curves at different degrees of opening of the valve, respectively. It has heretofore been common practice that, even if the water-level difference $h_{ij}$ has fluctuated, water at a fixed flow rate is deemed to flow when the degree of opening of the valve is constant. Therefore, an error from an actual flow rate has developed, and a highly precise control of the water supply has been impossible.

Figure 2A:
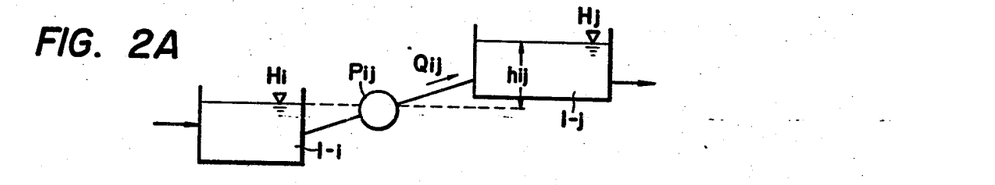
Figure 2B:
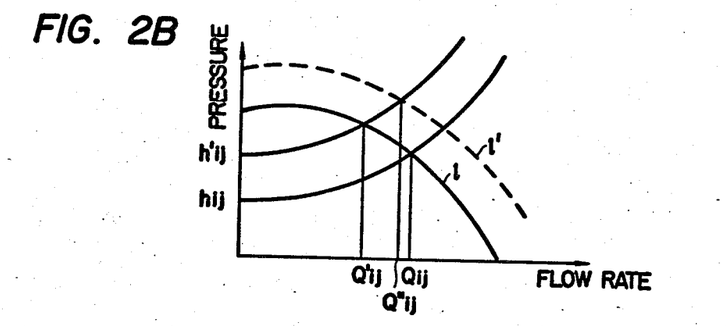

Also in case of a pumped flow unit wherein, as shown in FIG. 2A, water is raised from a reservoir 1-i to another reservoir 1-j with a pump $P_{ij}$, the fluctuation of a water-level difference $h_{ij}$ to $h'_{ij}$ changes the flow rate as illustrated in FIG. 2B. In the discharge pressure—flow rate characteristics of the pump indicated in FIG. 2B, a solid line l can be altered to a dotted line l' by controlling a running condition of the pump such as the number of revolutions.

SUMMARY OF THE INVENTION

This invention has for its object to provide a fluid transportation system which has solved the aforecited problem of the prior art.

Concretely, an object of this invention is to provide a system in which flow rates in pipelines connecting reservoirs, settling basins or the like can be controlled highly precisely with water-level fluctuations in the reservoirs, basins or the like taken into account.

In accordance with this invention, a flow rate $Q_{ij}(t)$ in a pipeline is calculated on the basis of a pressure balance condition from the water level $H_i(t)$ of any reservoir i and the water level $H_j(t)$ of another reservoir j to which water is supplied from the reservoir i through the pipeline.

Subsequently, the water level $H_j(t+1)$ of the reservoir j is calculated on the basis of a flow-rate balance condition from the flow rate $Q_{ij}(t)$, a predicted amount of demand $Q_{jj}(t)$ for water to be supplied from the reservoir j to consumers, and an outflow $Q_j(t)$ from the reservoir j to another reservoir.

In case where the calculated value $H_j(t+1)$ departs from a range of from a lower limit value to an upper limit value, a valve and a pump which are disposed in the pipeline are controlled to regulate an inflow to the reservoir j. As the result, water feed which satisfies the demand is made possible, and the reservoir j can be maintained at a scheduled water level at all times.

The other objects, advantages and subject matters of the present invention will become apparent from the following detailed description when read in conjunction with the accompanying drawings.

PREFERRED EMBODIMENTS OF THE INVENTION

Figure 3:
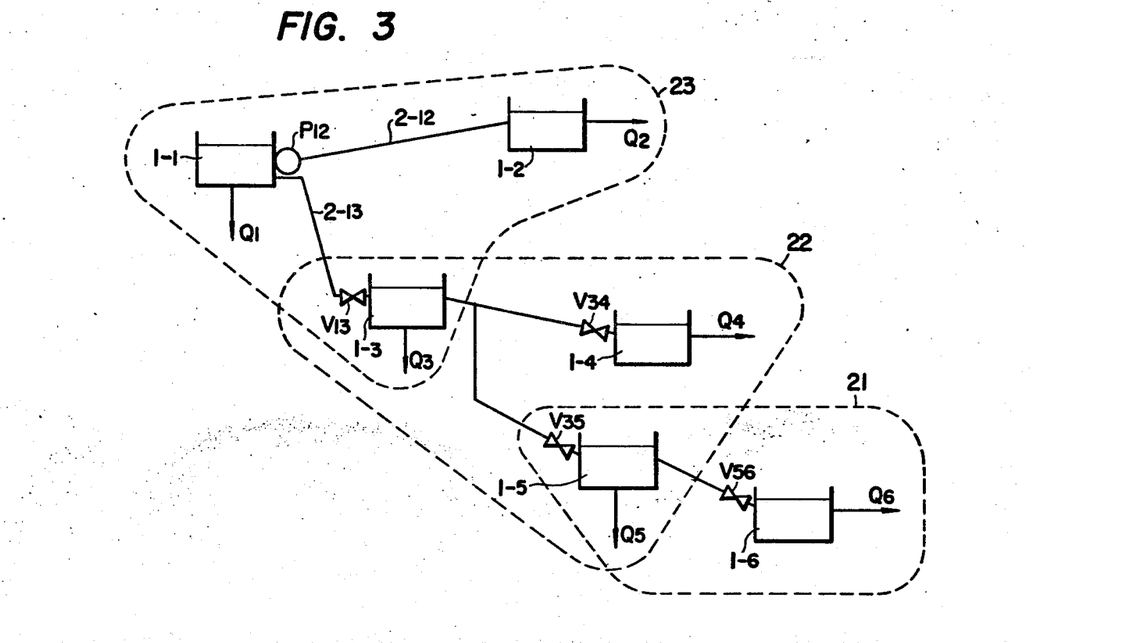
FIG. 3 and FIGS. 4A to 4C are diagrams for explaining the principle of this invention.

First of all, the principle of this invention will be described in detail. The subject system (water supply system) is assumed to be a system wherein, as illustrated in FIG. 3, reservoirs 1-i (i=1 to 6) are connected by pipelines 2-ij and the flow-rate control is done by means of pumps $P_{ij}$ or valves $V_{ij}$. The form of interconnections among the reservoirs 1-i may, in general, be a network. Herein, however, an arboraceous arrangement is considered in order to simplify the explanation. Water through each pipeline is supposed to flow in one direction, and the direction into which the water flows down is defined to be the downstream side of the system. An arrow led from each reservoir 1-i represents water feed from the particular reservoir 1-i to demand terminals (terminals using water), and the amount of the water feed is denoted by $Q_i$.

It is difficult in calculation to set up pressure and flow-rate balance equations as to the whole water supply system and to solve them at the same time. Therefore, the system is divided into configuration units as stated below, and pressure and flow-rate balance equations are set up for each configuration unit. Note is taken of one reservoir, and this reservoir and another reservoir on the downstream side as directly coupled with the particular reservoir by the pipeline are put together and are deemed one configuration unit. By way of example, the system of FIG. 3 consists of three configuration units 21, 22 and 23 enclosed with dotted lines.

Figure 4A:
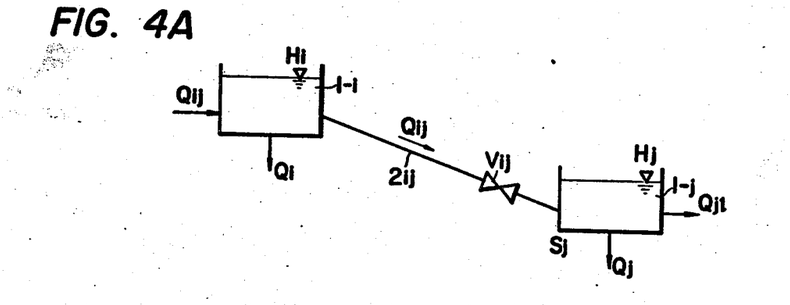
Figure 4B:
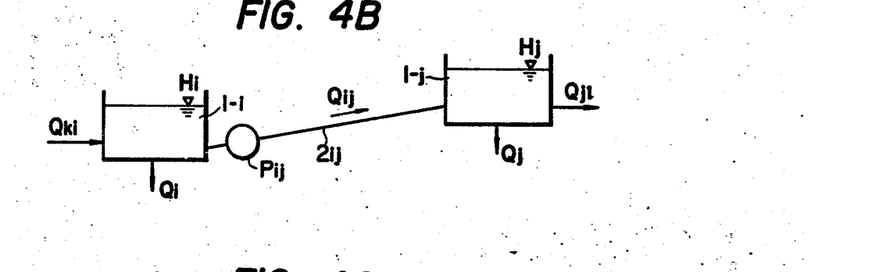
Figure 4C:
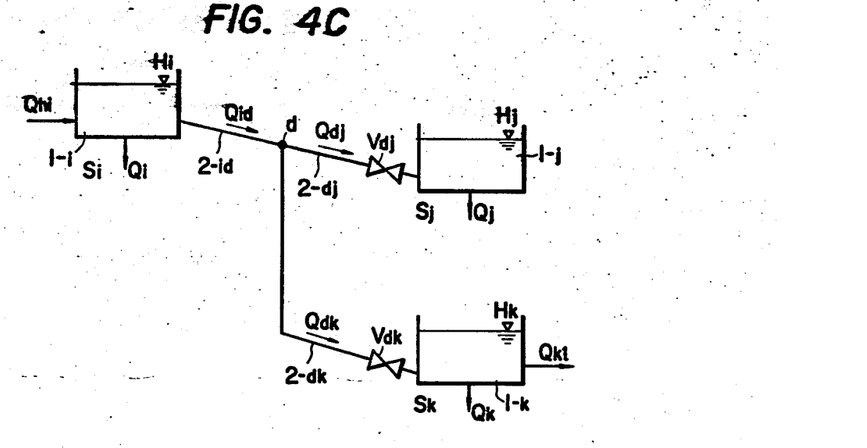

FIGS. 4A, 4B and 4C are diagrams each showing an example of the configuration unit thus obtained. FIG. 4A illustrates the configuration unit of the gravitated flow unit which consists of two reservoirs. FIG. 4B illustrates the configuration unit of the pumped flow unit which consists of two reservoirs. The example in FIG. 4C is the configuration unit of the gravitated flow unit which consists of three reservoirs 1-i, 1-j and 1-k and in which a pipeline is branched at a point d. Here, $H_i$ denotes the value of the water level of the reservoir 1-i as calculated in terms of the height above the sea, $Q_i$ the amount of water to be fed from the reservoir 1-i to demand terminals (the amount of demand), $S_i$ the area of the reservoir 1-i, and $Q_{ij}$ the flow rate of water flowing from the reservoir 1-i to the reservoir 1-j.

Using these examples, description will be made of the method for calculating the water level of a reservoir and the flow rate in a pipeline, that is, the method of calculation based on the pressure and flow-rate balance equations according to this invention. In the calculation, samplings are carried out at proper time intervals (at intervals of, for example, 10 minutes to 1 hour). Let $H_i(t)$ denote the water level at each sampling time t, and $Q_{ij}(t)$ and $Q_i(t)$ denote the flow rates of water flowing within the time interval. $Q_i(t)$ is supposed to have already been evaluated as a predicted value by a known calculating procedure for prediction on the basis of data in the past.

(A) Method of calculating the water level (flow-rate balance equation):

In FIG. 4A, the reservoir 1-j is noticed. In case where the flow rates $Q_{ij}(t)$ and $Q_{jk}(t)$ and the amount of demand $Q_j(t)$ at a time t are known, the water level $H_j(t+1)$ of the reservoir 1-j at a time t+1 is evaluated from the following equation:

$$H_j(t+1) = H_j(t) + (Q_{ij}(t) - Q_{jk}(t) - Q_j(t))/S_j \quad (1)$$

provided that the valve is not manipulated in a period (t, t+1) and that the quantities $Q_{ij}(t)$, $Q_{jk}(t)$ and $Q_j(t)$ undergo no large change. Here, it is assumed that the reservoir 1-j is a rectangular parallelepiped.

Also in case of the configuration unit shown in FIG. 4B or FIG. 4C, the water level $H_j(t+1)$ of the reservoir on the downstream side at the time (t+1) is evaluated by dealing with the inflow and outflow at the time t as in Eq. (1).

(B) Method of calculating the flow rate (pressure balance equation):

In the water supply facilities, circular pipelines of fixed size are employed. It is known that, in general, the following relation holds as the Hazen-Williams equations between the head loss $h_{lij}(t)$ and the flow rate $Q_{ij}(t)$ of a pipeline 2-ij:

$$h_{lij}(t) = A_{ij} \{Q_{ij}(t)\}^{1.85} \quad (2)$$

Here, $$A_{ij} = L_{ij}/(0.09375 \cdot C_{ij}^{1.85} \cdot D_{ij}^{4.87}) \quad (3)$$

where $C_{ij}$ denotes the speed reduction coefficient of the pipeline, $D_{ij}$ the pipe diameter, and $L_{ij}$ the pipe length. In addition, the following relation holds between the head loss $h_{Vij}(t)$ due to a valve and the velocity of flow $v_{ij}(t)$:

$$h_{Vij}(t) = (f_{Vij} \{v_{ij}(t)\}^2)/2g \quad (4)$$

where $f_{Vij}$ denotes the loss coefficient of the valve, and g the gravitational acceleration. The flow velocity $v_{ij}(t)$ is given by:

$$v_{ij}(t) = (4Q_{ij}(t)/(\pi \cdot D_{ij}^2))$$

By substituting this into Eq. (4), the equation of relation between the flow rate and the head loss due to the valve is obtained:

$$h_{Vij}(t) = A_{Vij} Q_{ij}(t)^2 \quad (4')$$

where $$A_{Vij} = f_{Vij}/(1.23364 \cdot g \cdot D_{ij}^4) \quad (5)$$

Further, the relation between the flow rate and the lift (discharge pressure) of a pump is represented by a nonlinear characteristic curve.

Letting the lift be $h_{Pij}(t)$, $$h_{Pij}(t) = f(Q_{ij}(t), \alpha_{ij}) \quad (6)$$

where $\alpha_{ij}$ is a parameter which varies depending on the number of pumps and the number of revolutions thereof.

Under the above preparations, the method of calculating the flow rate on the basis of the pressure balance equation will now be explained.

(a) System of FIG. 4A:

Among the water level $H_j(t)$ of the reservoir 1-j, the water level $H_i(t)$ of the reservoir 1-i, and the flow rate $Q_{ij}(t)$ at the time t, the following holds from the condition of pressure balance including the head loss $h_{lij}(t)$ in the pipeline and the head loss $h_{Vij}(t)$ due to the valve $V_{ij}$:

$$H_i(t) - H_j(t) = h_{lij}(t) + h_{Vij}(t)$$

By substituting Eqs. (2) and (4') into this equation, $$H_i(t) - H_j(t) = A_{ij} Q_{ij}(t)^{1.85} + A_{Vij} Q_{ij}(t)^2 \quad (7)$$

A and $A_V$ are given by Eqs. (3) and (5), respectively.

If $H_i(t)$ and $H_j(t)$ are known, $Q_{ij}(t)$ is evaluated by solving Eq. (7). As a procedure for the solution, there is a method based on the calculation of convergence. It is the easiest, however, to approximate $Q_{ij}(t)^{1.85}$ by a quadratic function in advance and to solve the quadratic equation.

(b) System of FIG. 4B:

Letting $h_{Pij}(t)$ denote the lift of the pump and $h_{lij}(t)$ denote the head loss of the pipeline, the following holds from the condition of pressure balance:

$$H_i(t) - H_j(t) + h_{Pij}(t) = h_{lij}(t)$$

By substituting Eqs. (2) and (6) into this equation, $$f(Q_{ij}(t), \alpha_{ij}) = H_j(t) - H_i(t) + A_{ij} Q_{ij}(t)^{1.85} \qquad (8)$$

where the coefficient $\alpha_{ij}$ is determined by the running state of the pump. If $H_i(t)$ and $H_j(t)$ are known, $Q_{ij}(t)$ is evaluated by solving Eq. (8).

In the practical calculation, a method wherein $f(Q_{ij}(t), \alpha_{ij})$ as well as $Q_{ij}(t)^{1.85}$ is approximated by a quadratic function with the method of least squares and wherein the quadratic equation is solved is simple.

(c) System of FIG. 4C:

In this case, the pipeline is branched midway. Letting $H_d(t)$ denote the water head of the branch point $d$ at the time $t$, the following equations hold from the relations of pressure balance:

$$H_d(t) - H_j(t) = A_{dj} Q_{dj}(t)^{1.85} + A_{Vdj} Q_{dj}(t)^2 \qquad (9)$$

$$H_d(t) - H_k(t) = A_{dk} Q_{dk}(t)^{1.85} + A_{Vdk} Q_{dk}(t)^2 \qquad (10)$$

$$H_i(t) - H_d(t) = A_{id} Q_{id}(t)^{1.85} \qquad (11)$$

$$Q_{id}(t) = Q_{dj} + Q_{dk} \qquad (12)$$

Here, $A_{dj}$, $A_{dk}$ and $A_{id}$ denote values obtained by performing the calculation of Eq. (3) for the pipelines 2-dj, 2-dk and 2-id, respectively. $A_{Vdj}$ and $A_{Vdk}$ denote values obtained by performing the calculation of Eq. (5) for the valves $V_{dj}$ and $V_{dk}$, respectively. If the water levels $H_i(t)$, $H_j(t)$ and $H_k(t)$ of the reservoirs 1-i, 1-j and 1-k at the time t are known, $Q_{id}(t)$, $Q_{dj}(t)$ and $Q_{dk}(t)$ are obtained by solving Eqs. (9) to (12).

While the methods of calculating the flow rate and the water level have been described above in connection with the three examples, calculations can be easily made as the variations of the three examples even in a variety of other configuration units.

Figure 5:
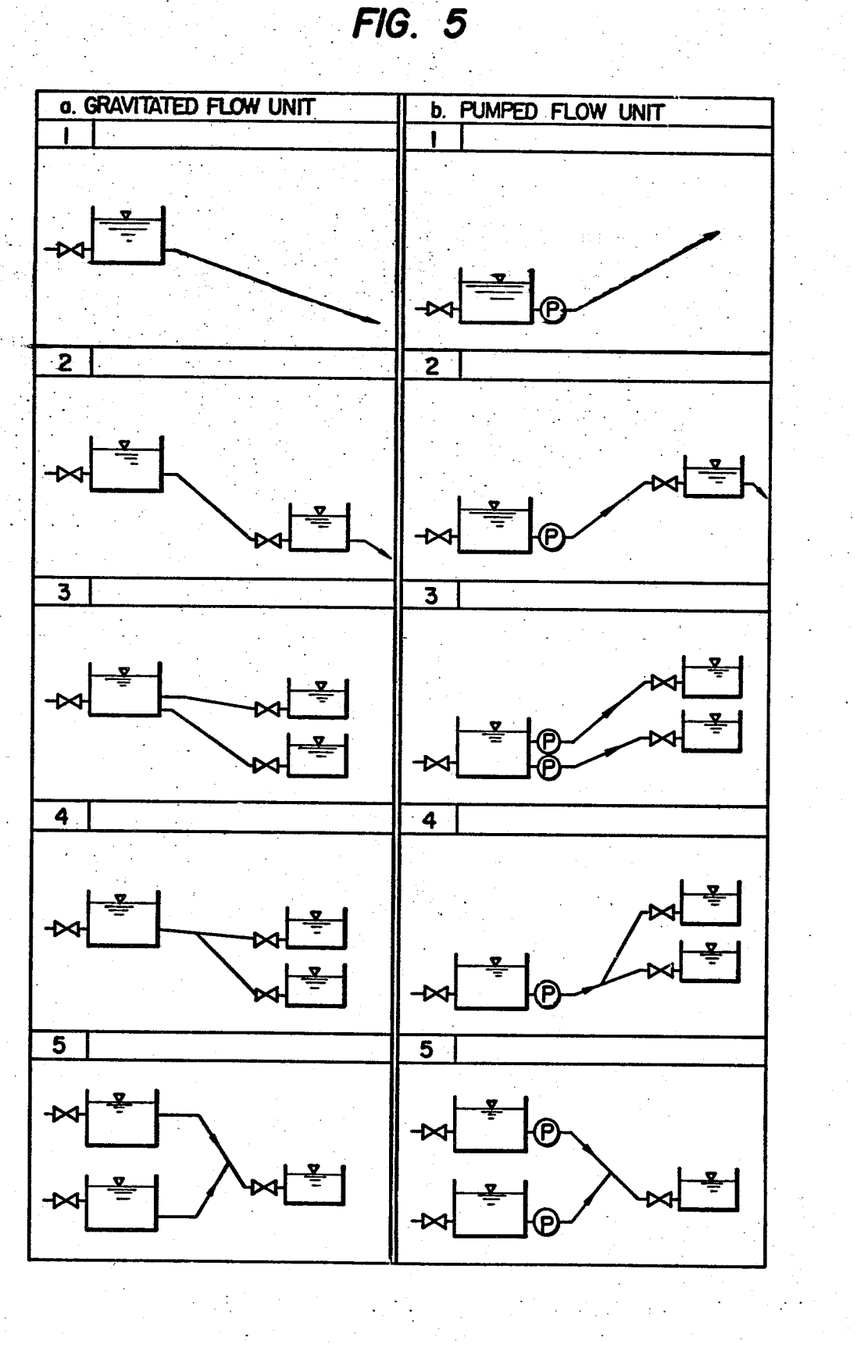
FIG. 5 shows schematic views for explaining the forms of connection of reservoirs.

A table of configuration units is shown in FIG. 5.

Now, a method of deciding the operation of the whole system by employing the method of calculating the flow rate and the water level in one configuration unit will be described with reference to the example of FIG. 3. Let it be supposed that each reservoir 1-i has the upper-limit and lower-limit water levels in the operation and that, as to the amount of demand $Q_i(t)$, a predicted value at each time has been evaluated by a known procedure for prediction of the demand on the basis of data in the past. First, the initial water levels of the reservoirs and the initial flow rates of the pipelines are set. They are set for the reservoirs and the pipelines of the whole system in conformity with certain rules, for example, that the water levels fill up the reservoirs initially and that the flow rates are the greatest possible flow rates. When the initial water level and the initial flow rate have been set, the valve loss factor $f_{Vij}$ given by Eq. (5) and the parameter $\alpha_{ij}$ determining the running state of the pump and given by Eq. (6) are obtained by the use of the foregoing pressure-balance equations (7), (8) and (9) to (12). These calculations are conducted for the respective configuration units, to determine the initial states of all the valves and the pump. By way of example, in the case of the configuration unit of FIG. 4A, when the initial water levels are represented by $H_i(0)$ and $H_j(0)$ and the initial flow rate is represented by $Q_{ij}(0)$, the initial valve loss factor $f_{Vij}(0)$ is evaluated from the following equation obtained from Eq. (7), and Eq. (5):

$$A_{Vij}(0) = (H_i(0) - H_j(0) - A_{ij} Q_{ij}(0)^{1.85})/Q_{ij}(0)^2$$

Figure 6:
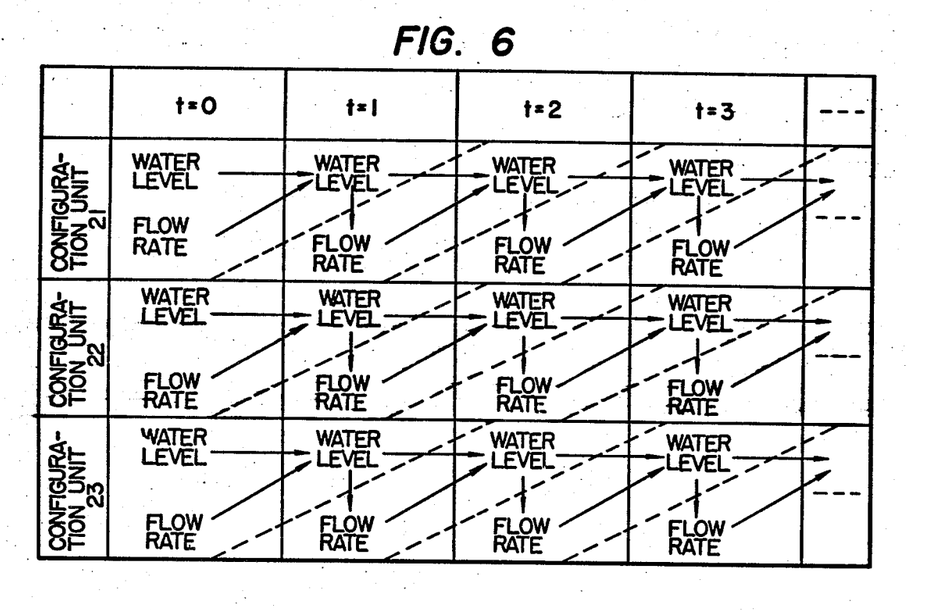
FIG. 6 is a diagram for explaining a calculating procedure according to this invention.

When the initial water level as well as the initial flow rate and the initial valve loss factor as well as the parameter determining the pump running above been determined, the water level at $t=1$ (the next time) is evaluated by the method of determining the water as previously stated, for example, with Eq. (1). Further, the flow rate at $t=1$ is evaluated from the water level at $t=1$ by the foregoing method of determining the flow rate, that is, with Eqs. (7), (8) and (9)–(12). Likewise, the water level at $t=2$ is evaluated from the water level and the flow rate at $t=1$. In this manner, the water levels and the flow rates at the respective times are sequentially determined. For each time, the calculations are done from the configuration unit on the lower stream side to the configuration unit on the upper stream side. The calculating procedure is shown in FIG. 6 by taking the system of FIG. 3 as an example. A portion enclosed with broken lines corresponds to one unit of calculations. The flow rates at $t=1$ and the water levels at $t=2$ are calculated in the order of the configuration unit 21, the configuration unit 22 and the configuration unit 23. Subsequently, the flow rates at $t=2$ and the water levels at $t=3$ are calculated in the same order.

In this way, the flow rates $Q_{ij}(t)$ and the reservoir water levels $H_i(t)$ based on the pressure and flow-rate balance equations can be evaluated every moment.

The above description has been devoted to the calculations of the water levels and the flow rates in the case where the degrees of opening of the valves and the states of the pumps, such as the manner of operated pumps and the numbers of revolutions thereof, which have been set at the initial time are not altered. In actuality, however, if the degrees of opening of the valves and the running states of the pumps remain unchanged, the reservoirs will overflow or become empty due to fluctuations in the amount of demand $Q_i$. In order to prevent such situations, according to this invention, the upper- and lower-limit values of the water level in the operation are determined, and the following method is adopted. That is, in case where the water level obtained by the above calculation is above the upper-limit value in the operation or below the lower-limit value, the valve loss factor on the inflow side of the reservoir or the value of the parameter of the pump running at the preceding time is altered, thereby to correct the flow rate at the preceding time and to confine the water level within the range between the upper- and lower-limit values. This procedure will be described more in detail by aking the configuration unit of FIG. 4A as an example. Let $UH_j$ denote the operational upper-limit value of the reservoir 1-j, and $LH_j$ denote the operational lower-limit value. It is assumed that the water level $H_j(t)$ of the reservoir 1-j at the time t has become:

$$H_j(t) < LH_j$$

Herein, the flow rate $Q_{ij}(t-1)$ at the preceding time $(t-1)$ is corrected as follows. The corrected flow rate $\tilde{Q}_{ij}(t-1)$ is as given below, with $U_{ij}$ denoting the flow rate at the time when the valve $V_{ij}$ is fully opened (denoting the maximum inflow):

$$\hat{Q}(t-1) = \text{Min}\ \{Q_j(t-1) + Q_{ij}(t-1),\ U_{ij}\} \qquad (13)$$

This signifies that when an inflow equal to an outflow is permitted to flow, setting is made so that the inflow may become the same as the outflow, and that when such is impossible, setting is made so that water at the greatest possible flow rate may flow into the reservoir 1-j as the inflow. From the corrected flow rate of Eq. (13) and Eqs. (5) and (7), the valve loss factor $\hat{f}_{Vij}$ can be determined anew.

$$\hat{f}_{Vij} = 1.23364 \cdot g \cdot D^4 \cdot \hat{A}_{Vij}$$

$$\hat{A}_{Vij} = (H_j(t-1) - H_i(t-1) - A_{ij}\hat{Q}_{ij}(t-1)^{1.85}) / \hat{Q}_{ij}(t-1)^2$$

On the other hand, in case where the water level has become:

$$H_j(t) > UH_j$$

the following correction is made:

$$\hat{Q}_{ij}(t-1) = Q_j(t-1) + Q_{ij}(t-1) \qquad (13')$$

The merit of this method of calculation is that the correcting calculation is possible within the frame of one calculation unit in FIG. 6. As regards the configuration unit including the pump, the value of the parameter representative of the running state of the pump is determined anew from the corrected flow rate. When Eq. (6) is approximated by the quadratic function of $h_{Pij}(t) = a_{ij} Q_{ij}(t)^2 + b_{ij}Q_{ij}(t) + c_{ij}$, the coefficient $a_{ij}$ of the second-power term, the coefficient $b_{ij}$ of the first-power term and the constant term $c_{ij}$ have the following relations in case of the control of the number of revolutions:

$$a_{ij} = a_{0ij}$$

$$b_{ij} = a_{ij} \cdot b_{0ij}$$

$$c_{ij} = a_{ij}^2 \cdot c_{0ij}$$

Here, $a_{0ij}$, $b_{0ij}$ and $c_{0ij}$ are constant against the change of the number of revolutions, and $\alpha_{ij}$ depends on the change of the number of revolutions. Accordingly, there is the single independent parameter, and once the corrected flow rate has been determined, $a_{ij}$, $b_{ij}$ and $c_{ij}$ are decided from Eq. (8). In case of the control of the number of pumps, the following relations hold:

$$a_{ij} = a_{0ij}/\alpha_{ij}^2$$

$$b_{ij} = b_{0ij}/\alpha_{ij}$$

$$c_{ij} = c_{0ij}$$

Here, each of $a_{0ij}$, $b_{0ij}$ and $c_{0ij}$ is a parameter corresponding to the running of one pump, and $\alpha_{ij}$ represents the number of pumps. Once the corrected flow rate has been determined, $\alpha_{ij}$ is calculated from Eq. (8). In the case of the control of the number of pumps, $\alpha_{ij}$ can assume only the value of a natural number. Therefore, $\alpha_{ij}$ is determined as the natural number value with which the water level at the time t falls within the allowable range and which is the closest to the calculated value. When the new valve loss factor or pump running parameter has thus been decided, the calculations of the water levels and the flow rates are conducted at and after the next time by using the new values.

Now, description will be made of a method for bringing the water level of the reservoir at an end time into a desired water level. A time at which the valve loss factor and the pump running parameter are determined in order to establish the desired water level at the end time, is called the reset time and is represented by T. This value is externally set. The end time is denoted by $T_E$. Since calculations concerned are also executed every configuration unit, the configuration unit of FIG. 4A is taken as an example. Letting $H_{jE}$ denote the desired water level of the reservoir 1-j at the end time $T_E$, the mean value $\bar{Q}_{ij}$ of a required flow rate after the time T becomes:

$$\bar{Q}_{ij} = \frac{\sum_{t=T}^{T_E} \{\hat{Q}_j(t) + Q_{ij}(t)\} + S_j\{H_{jE} - H_j(T_E)\}}{T_E - T} \qquad (14)$$

The loss factor due to the valve to make the corrected flow rate $\hat{Q}_{ij}(T)$ at $t = T$ as follows:

$$\hat{Q}_{ij}(t) = \bar{Q}_{ij} \qquad (15)$$

is decided from Eqs. (5) and (7). These calculations are executed for the respective configuration units, to determine the states of all the valves and pumps at the reset time. However, even when the valves and pumps are operated under the determined states, the flow rates $\hat{Q}_{ij}(T)$, $\hat{Q}_{ij}(T+1)$, ... and $\hat{Q}_{ij}(T_E)$ do not always become equal to $\bar{Q}_{ij}$ on account of fluctuations in the water level. Therefore, the water level $H_j(T_E)$ of the reservoir 1-j at the end time $T_E$ does not become the desired water level $H_{jE}$.

In order to bring $H_j(T_E)$ still closer to $H_{jE}$, the following correction is made. The valve and pump states temporarily decided as described above are subjected to the foregoing correcting calculations of the water level and the flow rate. Now, the configuration unit of FIG. 4A is taken an example. Letting $\hat{Q}_{ij}(t)$ and $\hat{H}_j(t)$ denote the corrected flow rate and water level at each time as evaluated as set forth above, respectively, a further corrected flow rate $\hat{\hat{Q}}_{ij}(t)$ becomes:

$$\hat{\hat{Q}}_{ij}(t) = \hat{Q}_{ij}(t) + \Delta Q_{ij}(t) \qquad (T \leq t \leq T_E) \qquad (16)$$

where $$\Delta Q_{ij}(t) = S_j \{H_{jE} - \hat{H}_j(T_E)\} \cdot \frac{\hat{Q}_{ij}(t)}{\sum_{t=T}^{T_E} \hat{Q}_{ij}(t)} \qquad (17)$$

This $\hat{\hat{Q}}_{ij}(t)$ is determined as the flow rate at the reset time anew. In this way, the further corrected flow rates are calculated for all the pipelines, and the corresponding states of the valves and pumps are determined.

In the way described above, command values for the pumps and the valves can be determined. On the next day, the water supply system is operated according to the command values from the initial states.

Figure 7:
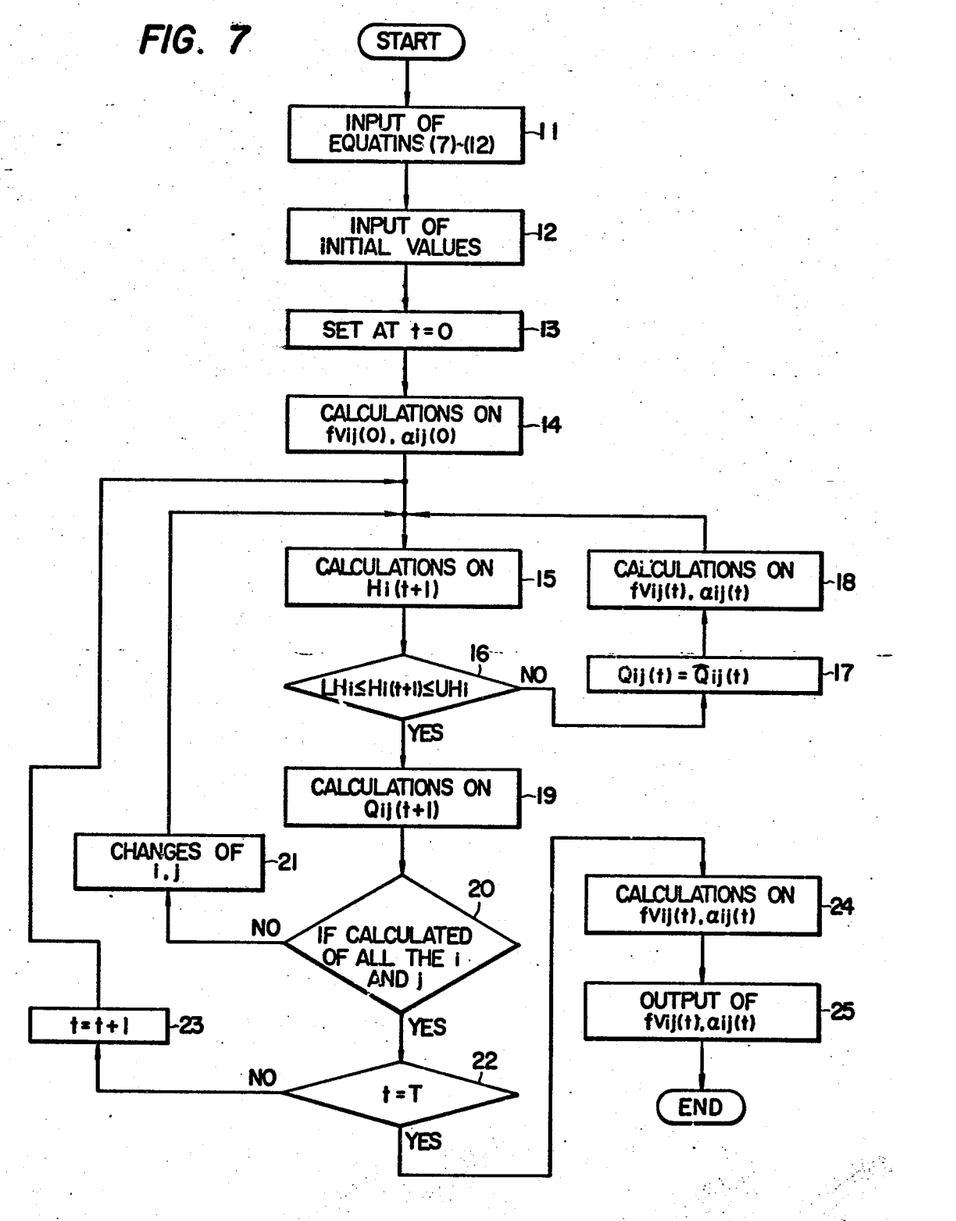
FIG. 7 is a flow chart showing a calculating procedure.

FIG. 7 shows a flow chart at the time when the decision of the command values is executed with a computer.

(1) At a job step 11, the water supply system is divided into the configuration units, the inflow and outflow equations in the water-level calculating method as previously stated and the pressure and flow-rate balance equations (7), (8) and (9)–(12) in the flow-rate calculating method are set up for the respective configuration units, and these equations are entered from an input device into the computer.

(2) At a job step 12, the area $S_i$ of each reservoir 1-i, the initial water level $H_i(0)$, the desired water level $H_i(T_E)$ at the end time, the upper- and lower-limit values UHhd i and $LH_i$ of the water level, the initial flow rate $Q_{ij}(0)$, the amount of demand $Q_i(t)$, the length $L_{ij}$ of a pipeline 2-ij, the speed reduction coefficient $C_{ij}$, the pipe diameter $D_{ij}$, and the reset time T and end time $T_E$ are entered from the input device into the computer.

(3) At a job step 13, the value of a time counter is set to t=0.

(4) At a job step 14, the loss factor $f_{Vij}(0)$ of the valve provided in each pipeline 2-ij, at the initial time t=0 and the parameter $a_{ij}$ of the pump are evaluated by the use of Eqs. (7), (8) and (9) to (12) and Eqs. (5) and (6). In addition, ij's are set to the values of the configuration unit which lies at the lowest stream of the water supply system.

By the above job steps (1)–(4), the computer can be set at the initial values.

(5) At a job step 15, $H_i(t+1)$ is evaluated by Eq. (1).

(6) At a judgment step 16, whether or not $H_i(t+1)$ falls within a range of from the lower-limit value $LH_i$ to the upper-limit value $UH_i$ is judged. If it departs from the range, the corrected flow rate $\hat{Q}_{ij}(t)$ is evaluated by Eq. (13) or (13'), to put $Q_{ij}(t) = \hat{Q}_{ij}(t)$. The valve parameter $f_{Vij}(t)$ and the pump parameter $a_{ij}$ for the control of the inflow into the reservoir 1-j are evaluated with Eqs. (7), (8) and (9) to (12) and Eqs. (5) and (6) on the basis of the altered flow rate $Q_{ij}(t)$. Then, the job step 15 is returned to.

Thus, only when the reservoir becomes any water level outside the upper and lower limits, command values for altering the controlled variables of the valve and the pump can be obtained.

(7) At a job step 19, the flow rates $Q_{ij}(t+1)$ are evaluated by the use of Eqs. (7), (8) and (9) to (12).

(8) At a judgment step 20, it is judged if the alterations have been completed for all the configuration units represented by ij's. That is, it is judged if the water levels $H_i(t)$ and the flow rates $Q_{ij}(t)$ have been evaluated up to the uppermost-stream configuration unit. Only when they have not been evaluated, ij's are altered from the lower-stream side configuration unit towards the upper-stream one with a predetermined transistion table or the like at a job step 21, and the step 15 is returned to. When they all have been evaluated, a step 22 is shifted to.

(9) At the step 22, whether or not the time t is equal to the reset time T is judged. If not, t=t+1 is put at a step 23, and the step 15 is returned to. If t=T, the processing is shifted to a step 24 for making corrections so as to establish the desired water level $H_i(T_E)$ at the end time $T_E$.

(10) At the step 24, $\hat{Q}_{ij}(t)$ is evaluated with Eqs. (14) to (17), to put $Q_{ij}(t) = \hat{Q}_{ij}(t)$. Using the altered $Q_{ij}(t)$, $f_{Vij}(t)$ and $a_{ij}(t)$ are evaluated likewise to the above.

(11) In this way, the valve loss factor $f_{Vij}(t)$ and the pump parameter $a_{ij}(t)$ of one day are evaluated, and command values are provided by the use of a conversion table having been obtained by measurements beforehand.

Figure 8:
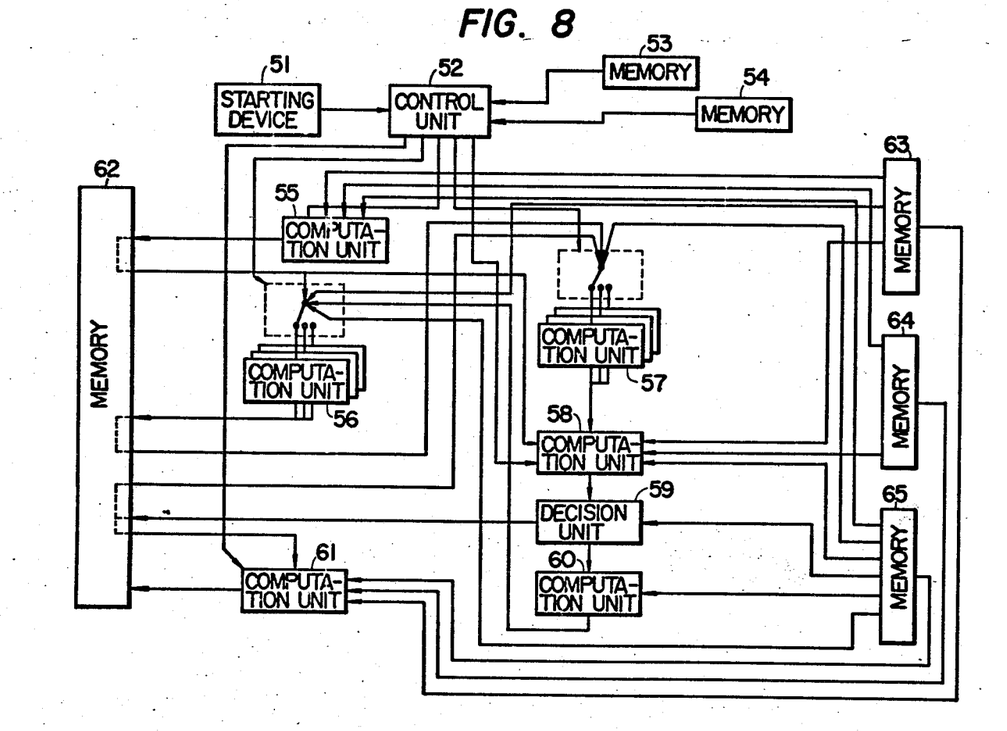
FIG. 8 is a block diagram showing an example of apparatus for calculating the flow-rate allocation in the system of this invention.

FIG. 8 shows an example of a hardware for the command value determination in the operating method of this invention, that is, apparatus for scheduling the flow-rate allocation.

A control unit 52 is started by a starting device 51. The control unit 52 controls a computation procedure and units therefor on the basis of information from a memory 53, in which pressure and flow-rate balance equations for the respective configuration units are stored, and a reset-time memory 54. An initial flow rate-computation unit 55 receives information of the initial water level of each reservoir, the predicted demand value of each reservoir and the water-level upper and lower limits of each reservoir from an initial water level and final water level-memory unit 63, a demand amount-memory unit 64 and a reservoir and pipeline data-memory unit 65, respectively, and it computes the initial flow rate. The result is stored in a memory unit 62. A valve loss factor and pump parameter-computation unit 56 receives the pipeline constant from the memory unit 65, the initial water level from the memory unit 63 and the initial flow rate from the memory unit 62, and computes the initial value of the valve loss factor or the pump parameter for the first configuration unit. Since the valve loss factor and pump parameter-computation unit 56 is required for each configuration unit, it is necessary to prepare a plurality of such computation units. Which of the computation units 56 is to be used is determined by the control unit 52 on the basis of information of the coupling relation between the reservoir and the pipeline. Subsequently, a water level-computation unit 58 is started by the control unit 52, and it computes the water level at the next time on the basis of the initial flow rate, the initial water level, the predicted demand value and the area of the reservoir. The result is checked by a water level-decision unit 59 as to whether or not the range of from the lower-limit water level to the upper-limit water level is satisfied. If it is satisfied, the result is stored as a scheduled water level in the computation result-memory unit 62. Upon completion of the computation for one configuration unit, the control unit 52 controls the valve loss factor and pump parameter-computation unit 56 so as to shift to the computation of the next configuration unit. Upon completion of the computations of all the configuration units, the control unit 52 starts a flow rate-computation unit 57 and commences computations at the next time. The flow rate-computation unit 57 receives the scheduled water level at the present time and the value of the valve loss factor or pump parameter from the computed result-memory unit 62 and the constant of each pipeline from the memory unit 65 and performs the flow-rate computation for the first configuration unit. Since the flow rate-computation unit 57 is required for each configuration unit, a plurality of such computation units need to be prepared. Which of the computation units 57 is to be used is determined by the control unit 52 on the basis of information of the pressure and flow-rate balance equations of the reservoir and the pipeline. Upon completion of the flow-rate computation, a similar computation to that in the first time is initiated. When the water level-decision unit 59 decides that the water level does not meet the restrictive conditions, a corrected flow rate-computation unit 60 corrects the flow rate so that it may fulfill the restrictive conditions. When the flow rate has been corrected, the control unit 52 starts the valve loss factor and pump parameter-computation unit 56, to evaluate the value of the valve loss factor or pump parameter as satisfies the corrected flow rate. The subsequent computations of the flow rates are carried out by the use of the valve loss factor or pump parameter here determined anew. In this manner, the computations of the flow rates and the water levels at the respective times are conducted. When the reset time is reached, the control unit 52 starts a computation unit 61 for flow rates and water levels after the reset time. The computation unit 62 receives the water level at the reset time from the computed result-memory unit 62, the final water level from the memory unit 63, the amount of demand from the reset time to the end time from the demand amount-memory unit 64, and the reservoir area from the reservoir and pipeline data-memory unit 65, and it computes the flow rates and the water levels from the reset time to the end time. Then, the flow-rate and water-level computations at all the times are completed.

Figure 9:
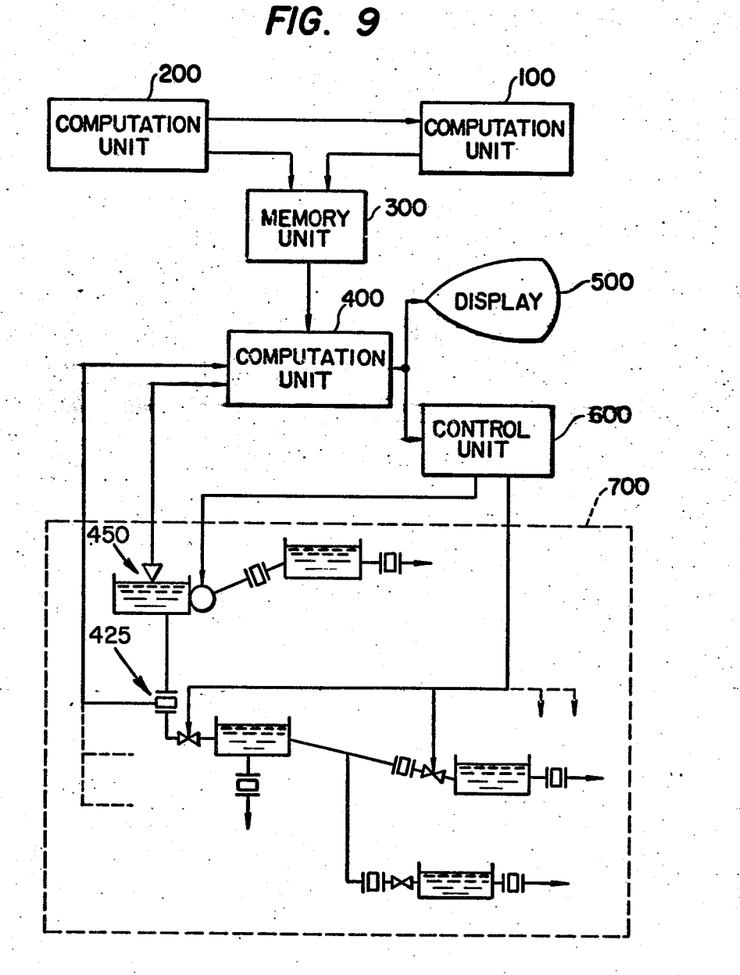
FIG. 9 is a block diagram of an embodiment of this invention.

FIG. 9 shows an example of a reservoir operating system which is constructed by incorporating the flow rate allocation-scheduling apparatus shown in FIG. 8. A predicted amount of demand for every one hour of next day is computed by a predicted demand-computation unit 200 (which is known in itself). The value is entered into a flow rate allocation-computation unit 100. The flow rate allocation-scheduling unit 100 computes the flow rate and the water level for every hour, and the results of the flow rate, the water level, the valve loss factor, the pump parameter, etc. are stored in a data memory 300.

A corrected flow rate allocation-computation unit 400 makes corrections of the scheduled flow rate and the scheduled water level on the basis of an actually measured flow rate and an actually measured water level obtained with telemeters schematically illustrated, for example, at 425, 450, respectively in FIG. 9. Command values corresponding to the corrected flow rate and water level are entered into a control unit 600 for valves and pumps, and the control of the valves and pumps within a controlled system 700 is carried out. Shown at 500 is a display device which indicates the scheduled flow rate and water level, the actual flow rate and water level, the corrected flow rate and water level, etc.

Now, description will be made of the operation contents of the flow rate allocation on-line correction unit 400. This unit loads an actually measured amount of demand (actual-result demand amount) and an actually measured water level (actual-result water level) by means of the telemeters. It computes the deviation from the scheduled value, of the actual-result value or a predicted value, calculated from the actual-result value, and it corrects the scheduled value when the deviation exceeds a criterion.

First, the corrected value of the predicted demand value is found for each reservoir. The present time is denoted by $t_0$, and one reservoir 1-j is noticed. The actual-result demand amount per hour at the time $t_0$ is denoted by $q_j(t)$, the predicted demand amount per hour at a time $t=(t_0+1)-(t_0+N-1)$ is denoted by $Q_j(t)$, and the corrected value of the amount $Q_j(t)$ is denoted by $\hat{Q}_j(t)$.

$$\hat{Q}_j(t) = Q_j(t) \frac{q_j(t_0)}{Q_j(t_0)} \quad (t = t_0, t_0+1, \ldots t_0+N-1) \quad (18)$$

Figure 10:
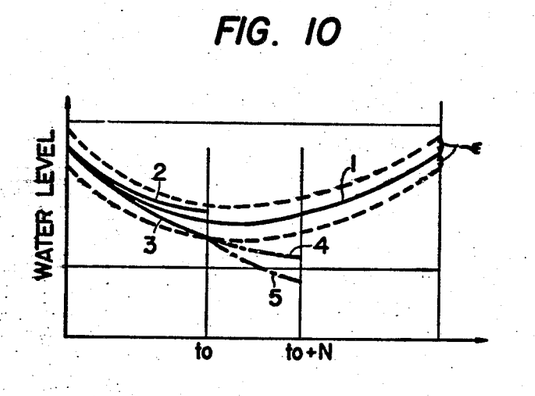
FIGS. 10 and 11 are diagrams for explaining a method for correcting a calculated value of the flow-rate allocation.

This is a system wherein the predicted demand value in the future time ($t_0-t_0+N-1$) is corrected by the ratio beetween the actual-result value at the present time and the predicted value. Subsequently, there are executed the comparative computations of the measured value $h_j(t_0)$ of the water level of the reservoir 1-j and the scheduled vaue $H_j(t_0)$ indicated by a curve 1 in FIG. 10. Letting $\epsilon$ denote the criterion width, if $$|h_j(t_0) - H_j(t_0)| \leq \epsilon \quad (19)$$

holds, the water level and the inflow of this reservoir are not subjected to the corrections of the scheduled values. By way of example, in a case illustrated by a curve 2 in FIG. 10, the corrections are not made. When Eq. (19) does not hold, for example, when the situation is as indicated by a curve 4 in FIG. 10, the predicted water level $\hat{H}_j(t_0+N)$ after N hours is computed as stated below. Letting the scheduled inflow value be $Q_{ij}(t)$, $$\hat{H}_j(t_0+N) = h_j(t_0) + \frac{\sum_{t=t_0}^{t_0+N-1}\{Q_{ij}(t) - \hat{Q}_j(t)\}}{S_j} \quad (20)$$

where $S_j$ denotes the area of the reservoir 1-j. Letting $UH_j$ and $LH_j$ denote the upper-limit value and the lower-limit value of the water level of the reservoir 1-j respectively, if $$LH_j \leq \hat{H}_j(t_0+N) \leq UH_j \quad (21)$$

holds, the scheduled value $H_j(t)$ of the water level is corrected as below.

$$H_j(t) = \hat{H}_j(t) \quad (t_0 \leq t \leq t_0+N-1) \quad (22)$$

When Eq. (21) does not hold, for example, when the water level after N hours departs from the upper- and lower-limit range in operation as indicated by a curve 5 in FIG. 10, the scheduled values of the inflow and the water level are corrected. First, let's consider a case where the water level is below the lower-limit value $LH_j$. Letting $$\Delta H_j = LH_j - \hat{H}_j(t_0+N)$$

the lacking amount of water, $\Delta H_j S_j$ is compensated for by the inflow at $t=(t_0+1)-(t_0+N-1)$. The corrected value $\hat{Q}_{ij}(t)$ of the inflow is made:

$$\hat{Q}_{ij}(t) = Q_{ij}(t) + \Delta H_j \cdot S_j \cdot \frac{Q_{ij}(t)}{\sum_{t=t_0}^{t_0+N-1} Q_{ij}(t)} \quad (23)$$

where $t_0 \leq t \leq t_0+N-1$. The scheduled water level $H_j(t)$ is corrected as follows:

$$H_j(t) = \hat{H}_j(t) = H_j(t) + \frac{\sum_{t=t_0}^{t_0+N-1}\{\hat{Q}_{ij}(t) - Q_{ij}(t)\}}{S_j}$$

When the upper-limit value is exceeded, the computations are similarly carried out.

Figure 11:
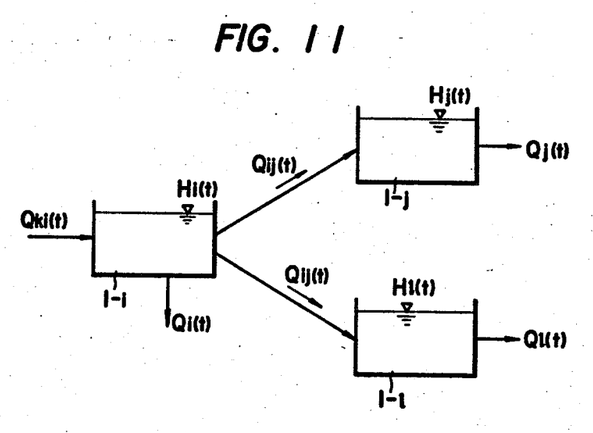

The correcting computations as described above are executed succes vely from the reservoir on the downstream side. In case where the inflow of the lower-stream reservoir has been corrected, the water-level predicting computation of the upper-stream reservoir is executed by the use of the corrected value. By way of example, in a system shown in FIG. 11, it is assumed that the correcting computations of the reservoirs 1-i and 1-j have been completed, that $Q_{ij}(t)$ has been corrected to $\hat{Q}_{ij}(t)$ and that $Q_{li}(t)$ has not been corrected. Then, the water-level predicting calculation of Eq. (16) becomes as follows:

$$\hat{H}_i(t) = h_i(t_0) + \frac{\sum_{}^{N-1} \{Q_{ki}(t) - \hat{Q}_{ij}(t) - Q_l(t) - Q_i(t)\}}{S_i} \quad (24)$$

As the criterion $\epsilon$, a proper value is determined for each reservoir.

The features of this system are as listed below.

(1) If the deviation between the scheduled water level and the actually measured water level lies within the criterion, no correction is carried out. Therefore, frequency corrections are avoidable.

(2) When the deviation exceeds the criterion, the scheduled water level is firstly corrected. Accordingly, there is a little possibility that the correction will affect another reservoir.

(3) The correction is applied while predicting the water level after N hours. A dangerous state can therefore be avoided beforehand.

(4) The correction of the flow rate is gradually executed in N hours. Accordingly, there is a little possibility that the restriction of the upper limit of the flow rate will be interfered with.

(5) In consequence of Item (2), there is obtained a corrected value which meets an actual request that changes in the operating plan or the intake plan of a purification plant be avoided as far as possible.

As set forth above, according to this invention, the controls based on the pressure and flow-rate balance equations are executed, and hence, the water supply system can be operated at high precision. Since the inflow to the reservoir is controlled, the influence of a fluctuation in the amount of demand is successively absorbed by the reservoirs on the upper stream side, and hence, the whole water supply system is prone to become stable quickly.

Only when the value of a scheduled water level deviates from an actually measured water level more than a predetermined value $\epsilon$, a command value is changed so as to bring the scheduled water level and the actually measured water level into coincidence. Therefore, the scheduled command value need not be altered sharply.

We claim:

1. A system having pipelines, a plurality of reservoirs and means for controlling the flow of fluid through said pipelines to, from, and between said plurality of reservoirs, comprising:

valves and pumps installed in the pipelines for regulating the flow rate of fluid passing therethrough;

first means for calculating the amount of predicted water demand $Q_{je}(t)$ which is supplied from any reservoir (j) to consummers and for producing an output signal representative thereof;

second means operatively associated with said first means for calculating flow rate $Q_{ij}(t)$ changing with time (t) of fluid flowing in a pipeline from a reservoir (i) to a reservoir (j), from fluid level $H_i(t)$, $H_j(t)$;

third means operatively associated with said first and second means for calculating fluid level $H(t+1)$ at the time (t+1) of the reservoir (j) from the predicted demand $Q_{je}(t)$ received from the first means, the amounts of inflow $Q_{ij}(t)$ and outflow $Q_j(t)$ thereof and the water level $H_j(t)$ at the time (t) of the reservoir (j); and fourth means operatively associated with said first, second, and third means for controlling manipulatable variables of the pumps and valves when the water level $H_j(t+1)$ thus obtained is below a predetermined lower limitation $LH_j$ or over an upper limitation $UH_j$ so as to keep actual levels of fluid within said reservoirs between predetermined levels.

2. Controlling system according to claim 1, comprising a digital computer, said computer constituting a combination of the first, second and third means.

3. System according to claim 1, which further comprises, in operative association with the first through fourth means, means for measuring both the actual fluid level $H_j(t)$ and the amount of the actual fluid demand $Q_{je}(t)$; and correction means for correcting the calculated fluid level of the reservoir (j) and predicted fluid demand on the basis of the values thus actually measured.

4. System according to claim 3, wherein said correction means comprises means for obtaining a corrected value, $\hat{Q}_j(t)$ of fluid demand from the following equation:

$$\hat{Q}_j(t) = Q_j(t) (q_j(t_0)/Q_j(t_0)) \quad (t=t_0, t_0+1, \cdots)$$

where
qj(t) is measured demand and
$Q_j(t)$ predicted demand.

5. The system according to claim 3, wherein said correction means includes means for correcting the calculated reservoir fluid level value H(t) when, $$|hj(t) - H_j(t)| > \epsilon$$

where hj(t) is measured value of the fluid level, predetermined constant.

6. System according to claim 5, wherein said third means includes means for obtaining a predicted fluid level at the time ($t_0+N$) from the following equation, $$\hat{H}_j(t_0+N) = hj(t) + \frac{\sum_{t=t_0}^{t_0+N-1} Q_{ij}(t) - Q_j(t)}{S_j}.$$

7. System according to claim 6, wherein said correction means includes means for correcting the flow rate $Q_{ij}(t)$ when the fluid level $H_j(t_0+N)$ becomes smaller than the lower limitation $LH_j$ or larger than the upper limitation $UH_j$.

8. System according to claim 1, wherein said third means includes means for obtaining the water level $H_j(t+1)$ from the following equation:

$$H_j(t+1) = H_j(t) + (Q_{ij}(t) - Q_{je}(t) - Q_j(t))/S_j.$$

9. System according to claim 1, wherein said third means includes means for obtaining the flow rate $Q_{ij}(t)$ from an equation of the condition of fluid pressure balance.

10. A system having pipelines, a plurality of reservoirs and means for controlling the flow through said pipelines to, from and between said plurality of reservoirs, comprising:
- flow regulating means installed in operative relationship to said pipelines for regulating the flow of fluid passing therethrough;
- level detecting means mounted in association with said reservoirs for detecting the levels of fluid therein and generating outputs representative thereof;
- flow rate detecting means mounted in association with said pipelines for detecting the flow rates therethrough, and for generating an output representative thereof;
- first control means for predicting demand for said fluid and for generating an output representative thereof;
- second control means for receiving an output from said first control means and determining a flow rate location schedule including scheduled flow rates in said pipelines and water levels in said reservoirs;
- third control means for correction of said scheduled flow rates and water levels in response to the output from said level and flow rate detecting means when said detected flow rates and levels deviate from said scheduled rates and levels by a predetermined amount; and
- fourth control means for operating said flow regulating means so as to control the flow rates and reservoir levels in accordance with said corrected scheduled flow rates and reservoir levels.

11. A system according to claim 10, comprising a digital computer, said computer constituting a combination of said first, second and third control means.